United States Patent
Dexter et al.

[15] 3,681,431
[45] Aug. 1, 1972

[54] N-OCTADECYL 3,5-DI-T-BUTYL-4-HYDROXYBENZOATE

[72] Inventors: Martin Dexter, Briarcliff Manor; John Denon Spivack, Spring Valley; David Herbert Steinberg, Bronx, all of N.Y.

[73] Assignee: Ciba-Geigy Corporation, New York, N.Y.

[22] Filed: Feb. 6, 1970

[21] Appl. No.: 7,417

Related U.S. Application Data

[60] Continuation of Ser. No. 616,794, Feb. 17, 1967, abandoned, which is a division of Ser. No. 354,434, March 24, 1964, Pat. No. 3,330,859, which is a continuation-in-part of Ser. No. 276,192, April 29, 1963, abandoned, which is a continuation-in-part of Ser. No. 164,618, Jan. 5, 1962, abandoned, which is a continuation-in-part of Ser. No. 148,738, Oct. 30, 1961, abandoned.

[52] U.S. Cl. ..................260/473 S, 44/70, 99/163, 252/407, 260/45.85, 260/398.5
[51] Int. Cl. ..................................C07c 69/78
[58] Field of Search..........................260/473

[56] References Cited

UNITED STATES PATENTS 3,112,338   11/1963   Smotney et al. ..............260/473

*Primary Examiner*—Lorraine A. Weinberger
*Assistant Examiner*—John F. Terapane
*Attorney*—Karl F. Jorda, Martin J. Spellman, Jr. and Bruce M. Collins

[57] ABSTRACT

Alkyl dialkylhydroxybenzoates of the formula:

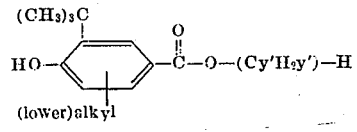

in which $y'$ has a value of from six to 20 inclusively, are useful in the stabilization of a variety of organic materials normally subject to oxidative deterioration. Organic polymeric substances such as polyolefins, lubricating oils, waxes and resins are among the organic materials stabilized.

1 Claim, No Drawings

N-OCTADECYL 3,5-DI-T-BUTYL-4-HYDROXYBENZOATE

CROSS REFERENCES TO RELATED APPLICATIONS

This application is a continuation of Ser. No. 616,794 filed Feb. 17, 1967, how abandoned which in turn is a division of copending application, Ser. No. 354,434, filed Mar. 24, 1964 now U.S. Pat. No. 3,330,859, which is a continuation-in-part of Ser. No. 276,192, filed Apr. 29, 1963 now abandoned, which is a continuation-in-part of Ser. No. 164,618, filed Jan. 5, 1962 now abandoned, which is a continuation-in-part of Ser. No. 148,738 filed Oct. 30, 1961, now abandoned.

THE INVENTION

This invention pertains to novel carboxylic acid esters which are useful in the stabilization of organic materials normally subject to oxidative deterioration.

Materials which are stabilized according to the present invention include synthetic organic polymeric substances such as vinyl resins formed from the polymerization of vinyl halides or from the copolymerization of vinyl halides with unsaturated polymerizable compounds, e.g., vinyl esters, α,β-unsaturated acids, α,β-unsaturated esters, α,β-unsaturated ketones, α,β-unsaturated aldehydes and unsaturated hydrocarbons such as butadienes and styrene; poly-α-olefins such as polyethylene, polypropylene, polybutylene, polyisoprene and the like, including copolymers of poly-α-olefins; polyurethanes such as are prepared from polyols and organic polyisocyanates; polyamides such as polyhexamethylene adipamide; polyesters such as polymethylene terephthalates; polycarbonates; polyacetols; polystyrene, polyethyleneoxide; and copolymers such as those of high impact polystyrene containing copolymers of butadiene and styrene and those formed by the copolymerization of acrylonitrile, butadiene and/or styrene. Other materials stabilized according to the present invention includes lubricating oil of the aliphatic ester type, e.g., di-(2-ethylhexyl)-azelate, pentaerythitol tetracaproate and the like; animal and vegetable derived oils, e.g., linseed oil, fat, tallow, lard, peanut oil, cod liver oil, castor oil, palm oil, corn oil, cotton seed oil and the like; hydrocarbon material such as gasoline, both natural and synthetic, diesel oil, mineral oil, fuel oil, drying oil, cutting fluids, waxes, resins and the like, fatty acids such as soaps and the like.

In general the stabilizers of this invention are employed from about 0.005 percent to about 10 percent by weight of the stabilized composition. A particularly advantageous range for polyolefins such as polypropylene is from about 0.1 percent to about 1 percent.

The compounds of the present invention are represented by the formula:

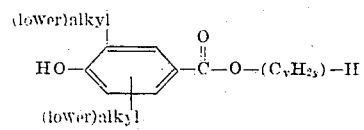

I wherein y has a value of from 6 to 30 inclusively.

Particularly useful compounds of the above class are those of the formula:

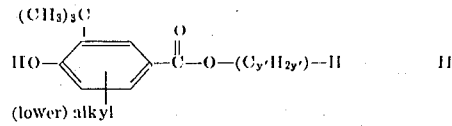

II in which y' has a value of from 6 to 20.

Within this group the preferred species may be represented by the formula:

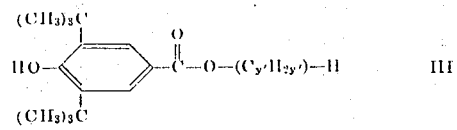

III

By the term "alkyl" and derivations thereof such as "alkylene" or "alkanoyl" is intended when used herein a group containing a branched or straight chain hydrocarbon chain of from one to 20 carbon atoms inclusively. Representative of such alkyl groups are thus methyl, ethyl propyl, butyl, t-butyl, octyl, decyl, dodecyl, tetradecyl, octadecyl, eicosyl and the like.

When the term "alkyl" is herein qualified by the designation "(lower)," there is intended a branched or straight chain hydrocarbon of from one to about six carbon atoms.

It will be observed, that the di(lower)alkylphenolic moiety in FORMULA I exhibits at least one (lower)alkyl group in a position ortho to the hydroxy group. The other (lower)alkyl group is either (a.) in the other position ortho to the hydroxy group or (b.) meta to the hydroxy group and para to the first (lower)-alkyl group. Although not so limited, these (lower)-alkyl groups are preferably branched groups such as t-butyl. Other arrangements, such as for example a 3-t-butyl-6-methyl-p-phenolic moiety, are however clearly envisioned.

The compounds of the present invention may be prepared via usual esterification procedures from a suitable alcohol and a benzoic acid of the formula:

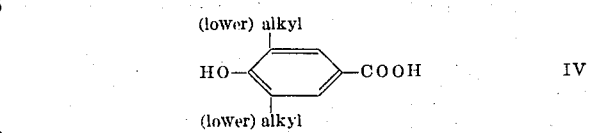

IV or an acid halide, acid anhydride or mixed anhydride thereof.

Similarly the novel esters of this invention may be prepared by conventional methods of transesterification.

The compounds of this invention may also be prepared by treating a dialkylphenol with a halo-ester of the formula:

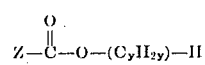

in which Z is halogen; e.g., Cl, Br, etc.

Stabilized compositions embracing the compounds of this invention, alone or in combination with other stabilizing materials, are more fully described in U.S. Pat. No. 3,285,855 issued Nov. 15, 1966 which was filed as a continuation-in-part of our then copending application Ser. No. 164,618 filed Jan. 5, 1962, now abandoned.

The following examples, presented for illustration and not limitation, will further serve to typify the nature of the present invention. In these examples, parts are by weight unless otherwise specified and temperature is expressed in degrees Centigrade. The relationship between parts by weight and parts by volume is as that of grams to cubic centimeters.

EXAMPLE 1 n-Octadecyl 3,5-di-t-butyl-4-hydroxybenzoate a. Methyl 3,5-di-t-butyl-4-hydroxybenzoate 40 parts of 2,6-di-t-butylphenol are dissolved in 150 parts by volume of methanol. To this solution are added 60 parts of sodium hydroxide as a 40 percent aqueous solution, followed by 1 part of cupric sulfate. The resulting mixture is then treated with 40 parts of carbon tetrachloride, which is added dropwise over a 15–20 minute interval. This causes the reaction temperature to rise to 75°–80°. Stirring is continued for 10 minutes after the addition of all reactants.

After cooling to room temperature, the reaction mixture is poured into 700 parts of water and the resulting solids are filtered to yield 68.5 parts of product. Further purification is achieved by recrystallization from aqueous acetic acid, benzene-hexane or, cyclohexane. Use of the last named solvent gives almost white crystals, m.p. 162°–163°.

b. n-Octadecyl 3,5-di-t-butyl-4-hydroxybenzoate

Methyl 3,5-di-t-butyl-4-hydroxybenzoate (6.6 parts), 13.5 parts of n-octadecyl alcohol and 0.2 parts of sodium methylate are mixed at room temperature and then heated at 150°±5° for 10 hours. During the final 2 hours of heating, an initial vacuum of 10–33 mm is applied, followed by a high vacuum of 0.5–1 mm for 0.2 hours. Removal of most of the impurities is accomplished by distillation at 125°–185°/0.25 mm. The residue (11.0 parts) is further purified by crystallization from acetone-cyclohexane to give a white crystalline product, melting at 65°–67°.

EXAMPLE 2 n-Hexyl 3,5-di-t-butyl-4-hydroxybenzoate n-Hexanol (1.84 parts) and 1.82 parts of triethylamine are dissolved in 50 parts by volume of dry benzene. 3,5-Di-t-butyl-4-hydroxybenzoylchloride (4.72 parts) dissolved in 25 parts by volume of dry benzene is added dropwise with stirring at 25°–30° over a period of 10 minutes. The reactants are then heated under reflux for 3 hours after which time 1.6 parts of triethylamine hydrochloride are removed by filtration. The yellow filtrate is washed with saturated sodium chloride solution, twice with 2N aqueous sodium carbonate solution and then again with saturated sodium chloride solution. After drying the solution over anhydrous sodium sulfate, the solvent is removed by evaporation. Six parts of a solid residue are thus obtained and purified by vacuum distillation. The n-hexyl 3,5-di-t-butyl-4-hydroxybenzoate distills at 150°–155°/0.1 mm, m.p. 70°–72°. The yield of the pure product is 3 parts.

n-Tetracosyl 3,5-di-t-butyl-4-hydroxybenzoate is prepared in an analogous manner with tetracosyl alcohol.

EXAMPLE 3 n-Dodecyl 3,5-di-t-butyl-4-hydroxybenzoate n-Dodecanol (2.78 parts) and 1.88 parts of triethylamine are dissolved in 50 parts by volume of dry benzene and 5.0 parts of 3,5-di-t-butyl-4-hydroxybenzoylchloride dissolved in 25 parts by volume of dry benzene are added dropwise with stirring at 25°–30° over a period of 10 minutes. The reactants are then heated under reflux for 3 hours. Triethylamine hydrochloride (1.85 parts) is removed by filtration and the yellow filtrate is washed with saturated sodium chloride solution, twice with 2N aqueous sodium bicarbonate solution, and again with saturated sodium chloride solution. The solution is then dried over anhydrous sodium sulfate and the solvent evaporated under vacuum. The residue comprising n-dodecyl 3,5-di-t-butyl-4-hydroxybenzoate (8 parts) is distilled at 189°–193°/1–2 microns, m.p. 47°–53°.

What is claimed is:

1. The compound n-octadecyl 3,5-di-t-butyl-4-hydroxy benzoate.

* * * * *